(No Model.)

T. T. ECKERT & G. B. SCOTT.
TYPE WHEEL.

No. 499,911. Patented June 20, 1893.

Witnesses
Geo. W. Breck
Edward Thorpe.

Inventors:
Thomas T. Eckert
George B. Scott
By their Attorney
C. L. Buckingham.

THE NORRIS PETERS CO., PHOTO-LITHO., WASHINGTON, D. C.

UNITED STATES PATENT OFFICE.

THOMAS T. ECKERT, OF NEW YORK, N. Y., AND GEORGE B. SCOTT, OF LAKEWOOD, NEW JERSEY, ASSIGNORS TO THE WESTERN UNION TELEGRAPH COMPANY, OF NEW YORK, N. Y.

TYPE-WHEEL.

SPECIFICATION forming part of Letters Patent No. 499,911, dated June 20, 1893.

Application filed August 13, 1888. Serial No. 282,547. (No model.)

*To all whom it may concern:*

Be it known that we, THOMAS T. ECKERT, residing in the city, county, and State of New York, and GEORGE B. SCOTT, residing in Lakewood, Ocean county, State of New Jersey, both citizens of the United States of America, have made a new and useful Improvement in Type-Wheels, of which the following is a specification.

Heretofore type-wheels have been constructed entirely of hard rubber, the type being integral with the body of the wheel; also with soft rubber type cast and vulcanized upon the periphery of a hard rubber wheel; also by forming soft rubber type upon a flat rubber ribbon and winding the latter around the periphery of a hub of rigid material.

In making our improved type-wheel, we employ a thick soft rubber annulus or ring having typographical characters, of substantially the same composition as that of the ring, integrally formed thereon; and this we term a rubber type-ring. The structure of the type and ring is homogeneous, said type and ring being of the same material, they being formed and prepared by the casting and vulcanization of a soft rubber composition, preferably such as is usually employed in making soft rubber type or stamps. Raised letters, homogeneous with the body of the type-ring, may also be formed by the cutting away or removal, in any manner whatever, of portions of the periphery of a plain soft rubber annulus. The rubber type-ring is then sprung over the periphery of a light frame or hub and there held by virtue of its elasticity under a considerable degree of tension, and in such manner that it may readily be removed and replaced.

We will now describe one form of our invention, including two species of certain details, by reference to the accompanying drawings.

Figure 1:
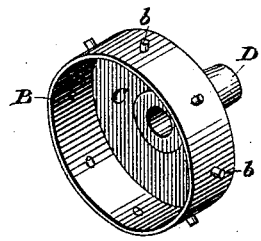
Figure 2:
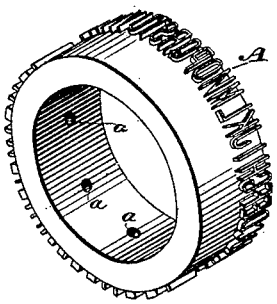
Figure 3:
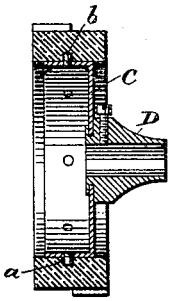
Figure 4:
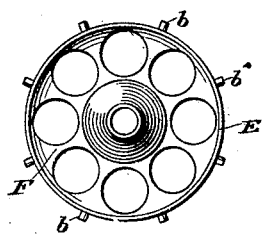
Figure 5:
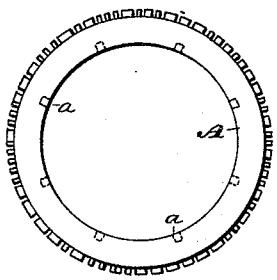
Figure 6:
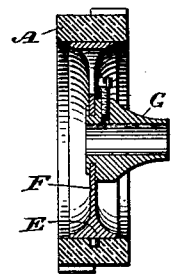

Figure 1 is a type-wheel hub formed by spinning aluminum or other metal into cup-shaped form. Fig. 2 is a perspective view of the rubber type ring. Fig. 3 is a longitudinal, central sectional view of the type-ring mounted upon the hub shown in Fig. 1. Fig. 4 is a modified form of hub turned from brass or other suitable material. Fig. 5 is a side elevation of the type-ring. Fig. 6 shows central section of the type-ring mounted upon the wheel frame represented in Fig. 4.

The rubber type-ring A consists of an annulus of soft vulcanized rubber; and when prepared for use is of about the same degree of elasticity and flexibility as ordinary soft rubber used in marking-stamps. As here shown the type are integrally formed upon the outer periphery of the rubber type-ring, though they might be placed upon the disk surfaces, while upon its interior surface is formed a series of shallow radial holes preferably at points equidistant from each other.

The rubber type-ring is best formed from a substance consisting of soft, white rubber gum, ordinarily employed in making soft rubber type in hand stamps or similar marking devices; while the type-ring with its peripheral characters and inner radial holes is preferably shaped by means of suitable molds. The form of the type-ring thus outlined at once suggests the required arrangement and configuration of the molds. As is shown in the drawings, that part of the mold for shaping the type and giving form to the periphery of the ring is a hollow cylinder having an inner surface provided with type-depressions or matrices and, in like manner, the inner surface of the type-ring is cast upon a cylindrical die having short radial pins, the latter being employed to form holes $a$ by which the ring is held to the hub of the wheel.

As used in printing-telegraphs, the ring should be about one-eighth of an inch thick and from three-sixteenths to three-eighths of an inch in width, though these proportions may be widely varied.

The soft rubber composition preparatory to being placed in the molds is reduced by a mild degree of heat to a soft plastic condition, rendering it under slight pressure capable of reaching and filling every part of the matrices. The molds when filled with such plastic composition are placed in a vulcanizer and there retained under the influence of heat until the rubber has assumed a degree of vulcanization substantially such as is attained in making soft rubber stamps. If a hot water vulcanizer is employed, about ninety pounds steam-gage pressure, or 320° Fahrenheit, for half an hour will be found sufficient.

The type-ring hub may be constructed in a variety of ways. As shown in Figs. 1 and 3, a light cup-shaped body having a periphery B and web C, is spun from aluminum, brass or other suitable material, and within an aperture of the web is inserted a hub D, whose end is burnished down. At equidistant points around periphery B, short radial pins b are affixed and their location upon the hub corresponds with the holes a in the type-ring A.

Figs. 4 and 6 show a form of type-ring hub having a peripheral band E and a web F formed from a piece of brass or other material, by turning down the disk surfaces on either side of the web leaving only a thin light skeleton. The web is then cut away by perforation, as seen in Fig. 4, and said pins b are soldered or otherwise attached to the periphery.

By means of the arrangement of type-ring and hub above described it is obvious that a type-wheel adapted to the uses of printing telegraph and type-writing machines is obtained possessing advantages of lightness, cheapness and durability not hitherto realized. An advantage of perhaps still more importance is found in the fact that a type-wheel may virtually be replaced by merely substituting a new type-ring for an old one, a matter involving only little time and expense, and not requiring the services of a skilled mechanic.

What we claim, and desire to secure by Letters Patent, is—

1. A type-wheel consisting of a seamless vulcanized soft rubber annulus, upon the periphery of which typographical characters are molded.

2. A type-wheel consisting of a seamless soft rubber ring or annulus upon the periphery of which typographical characters are cast, said ring and characters being vulcanized together to form an integral homogeneous mass.

3. An elastic seamless ring or annulus formed of vulcanized soft rubber upon the periphery of which typographical characters are molded or cast, as and for the purpose set forth.

4. The combination of an elastic type-ring formed of vulcanized soft rubber having radial apertures within the inner surface of the annulus, a hub of rigid material and radial projections for supporting and holding said ring in place, as and for the purpose set forth.

5. The combination of a type-ring A having holes a, and a hub of rigid material provided with pins b, substantially as set forth.

THOS. T. ECKERT.
GEO. B. SCOTT.

Witnesses:
RICHARD G. PAGE, Jr.,
WM. ARNOUX.